US005504834A

United States Patent [19]

Fette et al.

[11] Patent Number: 5,504,834

[45] Date of Patent: Apr. 2, 1996

[54] PITCH EPOCH SYNCHRONOUS LINEAR PREDICTIVE CODING VOCODER AND METHOD

[75] Inventors: Bruce A. Fette, Mesa; Sean S. You; Chad S. Bergstrom, both of Chandler, all of Ariz.

[73] Assignee: Motrola, Inc., Schaumburg, Ill.

[21] Appl. No.: 68,325

[22] Filed: May 28, 1993

[51] Int. Cl.[6] .................................. G01L 3/02; G01L 9/00

[52] U.S. Cl. ........................ 395/2.16; 395/2.15; 395/2.14; 395/2.1; 395/2.28

[58] Field of Search .................................. 381/51, 43, 35; 395/2, 2.1, 2.23, 2.28, 2.30, 2.31, 2.32, 2.12, 2.25, 2.29, 2.26

[56] References Cited

U.S. PATENT DOCUMENTS

| | | | |
|---|---|---|---|
| 4,815,134 | 3/1989 | Picone et al. | 395/2.31 |
| 4,899,385 | 2/1990 | Ketchum et al. | 395/2.32 |
| 4,963,034 | 10/1990 | Cuperman et al. | 395/2.31 |
| 4,969,192 | 11/1990 | Chen et al. | 395/2.31 |
| 5,027,404 | 6/1991 | Taguchi | 395/2.3 |
| 5,138,661 | 8/1992 | Zinser et al. | 381/35 |
| 5,265,190 | 11/1993 | Yip et al. | 395/2.28 |
| 5,293,449 | 3/1994 | Tzeng | 395/2.32 |
| 5,341,456 | 8/1994 | DeJaco | 395/2.23 |
| 5,371,853 | 12/1994 | Kao et al. | 395/2.32 |

OTHER PUBLICATIONS

Granzow et al, "High–quality digital speech at 4 kb/s"; Globecom '90: IEEE Global Telecommunications Conference, pp. 941–945, 1990.

Marques et al, "Improved pitch prediction with fractional delays in celp coding"; ICASSP '90: Acoustics, Speech and Signal Processing Conference, pp. 665–668, 1990.

An article entitled "High–Quality Speech Coding at 2.4 to 4.0 KBPS Based On Time–Frequency Interpolation" by Yair Shoham, Speech Coding Research Dept., A T & T Bell Laboratories, 1993 IEEE, (1993).

An article entitled "Implementation and Evaluation of a 2400 BPS Mixed Excitation LPC Vocoder" by Alan V. McCree and Thomas P. Barnwell III, School of Electrical Engineering, Georgia Institute of Technology, (1993).

An article entitled "Excitation–Synchronous Modeling of Voice Speech" by S. Parthasathy and Donald W. Tufts. from IEEE Transactions on Acoustics, Speech and Signal Processing, vol. ASSP–15, No. 9., (Sep. 1987).

An article entitled "Pitch Prediction Filters in Speech Coding", by R. P. Ramachandran and P. Kabal, in IEEE Transactions on Acoustics, Speech and Signal Processing, vol. 37, No. 4. (Apr. 1989).

*Primary Examiner*—David K. Moore
*Assistant Examiner*—Tariqrafiq Hafiz
*Attorney, Agent, or Firm*—Frederick M. Fliegel

[57] ABSTRACT

A method for pitch epoch synchronous encoding of speech signals. The method includes steps of providing an input speech signal, processing the input speech signal to characterize qualities including linear predictive coding coefficients and voicing, and characterizing excitation corresponding to the input speech signals using frequency domain techniques when input speech signals comprise voiced speech to provide an excitation function. The method also includes steps of characterizing the input speech signals using time domain techniques when the input speech signals comprise unvoiced speech to provide an excitation function and encoding the excitation function to provide a digital output signal representing the input speech signal.

9 Claims, 3 Drawing Sheets

PITCH EPOCH SYNCHRONOUS LINEAR PREDICTIVE CODING VOCODER AND METHOD

CROSS-REFERENCE TO RELATED APPLICATIONS

This application is related to co-pending U.S. patent applications Ser. No. 07/732,977, filed on Jul. 19 of 1991 and Ser. No. 08/068,918, entitled "Excitation Synchronous Time Encoding Vocoder And Method", filed on an even date herewith, which are assigned to the same assignee as the present application.

FIELD OF THE INVENTION

This invention relates in general to the field of digitally encoded human speech, in particular to coding and decoding techniques and more particularly to high fidelity techniques for digitally encoding speech and transmitting digitally encoded speech using reduced bandwidth in concert with synthesizing speech signals of increased clarity from digital codes.

BACKGROUND OF THE INVENTION

Digital encoding of speech signals and/or decoding of digital signals to provide intelligible speech signals are important for many electronic products providing secure communications capabilities, communications via digital links or speech output signals derived from computer instructions.

Many digital voice systems suffer from poor perceptual quality in the synthesized speech. Insufficient characterization of input speech basis elements, bandwidth limitations and subsequent reconstruction of synthesized speech signals from encoded digital representations all contribute to perceptual degradation of synthesized speech quality. Moreover, some information carrying capacity is lost; the nuances, intonations and emphases imparted by the speaker carry subtle but significant messages lost in varying degrees through corruption in en- and subsequent de-coding of speech signals transmitted in digital form.

In particular, auto-regressive linear predictive coding (LPC) techniques comprise a system transfer function having all poles and no zeroes. These prior art coding techniques and especially those utilizing linear predictive coding analysis tend to neglect all resonance contributions from the nasal cavities (which essentially provide the "zeroes" in the transfer function describing the human speech apparatus) and result in reproduced speech having an artificially "tinny" or "nasal" quality.

Standard techniques for digitally encoding and decoding speech generally utilize signal processing analysis techniques which require significant bandwidth in realizing high quality real-time communication.

What are needed are apparatus and methods for rapidly and accurately characterizing speech signals in a fashion lending itself to digital representation thereof as well as synthesis methods and apparatus for providing speech signals from digital representations which provide high fidelity and conserve digital bandwidth requirements.

SUMMARY OF THE INVENTION

Briefly stated, there is provided a new and improved apparatus for digital speech representation and reconstruction and a method therefor.

A method for pitch epoch synchronous encoding of speech signals. The method includes steps of providing an input speech signal, processing the input speech signal to characterize qualities including linear predictive coding coefficients and voicing, characterizing input speech signals using frequency domain techniques when input speech signals comprise voiced speech to provide an excitation function, characterizing the input speech signals using time domain techniques when the input speech signals comprise unvoiced speech to provide an excitation function and encoding the excitation function to provide a digital output signal representing the input speech signal.

In a preferred embodiment, the apparatus comprises an apparatus for pitch epoch synchronous decoding of digital signals representing encoded speech signals. The apparatus includes an input for receiving digital signal, an apparatus for determining voicing of the input digital signal coupled to the input, a first apparatus for synthesizing speech signals using frequency domain techniques when the input digital signal represents voiced speech and a second apparatus for synthesizing speech signals using time domain techniques when the input digital signal represents unvoiced speech. The first and second apparatus synthesize speech signals each coupled to the apparatus for determining voicing.

An apparatus for pitch epoch synchronous decoding of digital signals representing encoded speech signals includes an input for receiving digital signals and an apparatus for determining voicing of the input digital signals. The apparatus for determining voicing is coupled to the input. The apparatus also includes a first apparatus for synthesizing speech signals using frequency domain techniques when the input digital signal represents voiced speech and a second apparatus for synthesizing speech signals using time domain techniques when the input digital signal represents unvoiced speech. The first and second apparatus for synthesizing speech signals each are coupled to the apparatus for determining voicing.

An apparatus for pitch epoch synchronous encoding of speech signals includes an input for receiving input speech signals and an apparatus for determining voicing of the input speech signals. The apparatus for determining voicing is coupled to the input. The apparatus further includes a first device for characterizing the input speech signals using frequency domain techniques, which is coupled to the apparatus for determining voicing. The first characterizing device operates when the input speech signals comprise voiced speech and provides frequency domain characterized speech as output signals. The apparatus further includes a second device for characterizing the input speech signals using time domain techniques, which is also coupled to the apparatus for determining voicing. The second characterizing device operates when the input speech signals comprise unvoiced speech and provides characterized speech as output signals. The apparatus also includes an encoder for encoding the characterized speech to provide a digital output signal representing the input speech signal, which encoder is coupled to the first and second characterizing devices.

BRIEF DESCRIPTION OF THE DRAWING

The invention is pointed out with particularity in the appended claims. However, a more complete understanding of the present invention may be derived by referring to the detailed description and claims when considered in connection with the figures, wherein like reference numbers refer to similar items throughout the figures, and:

Figure 1:
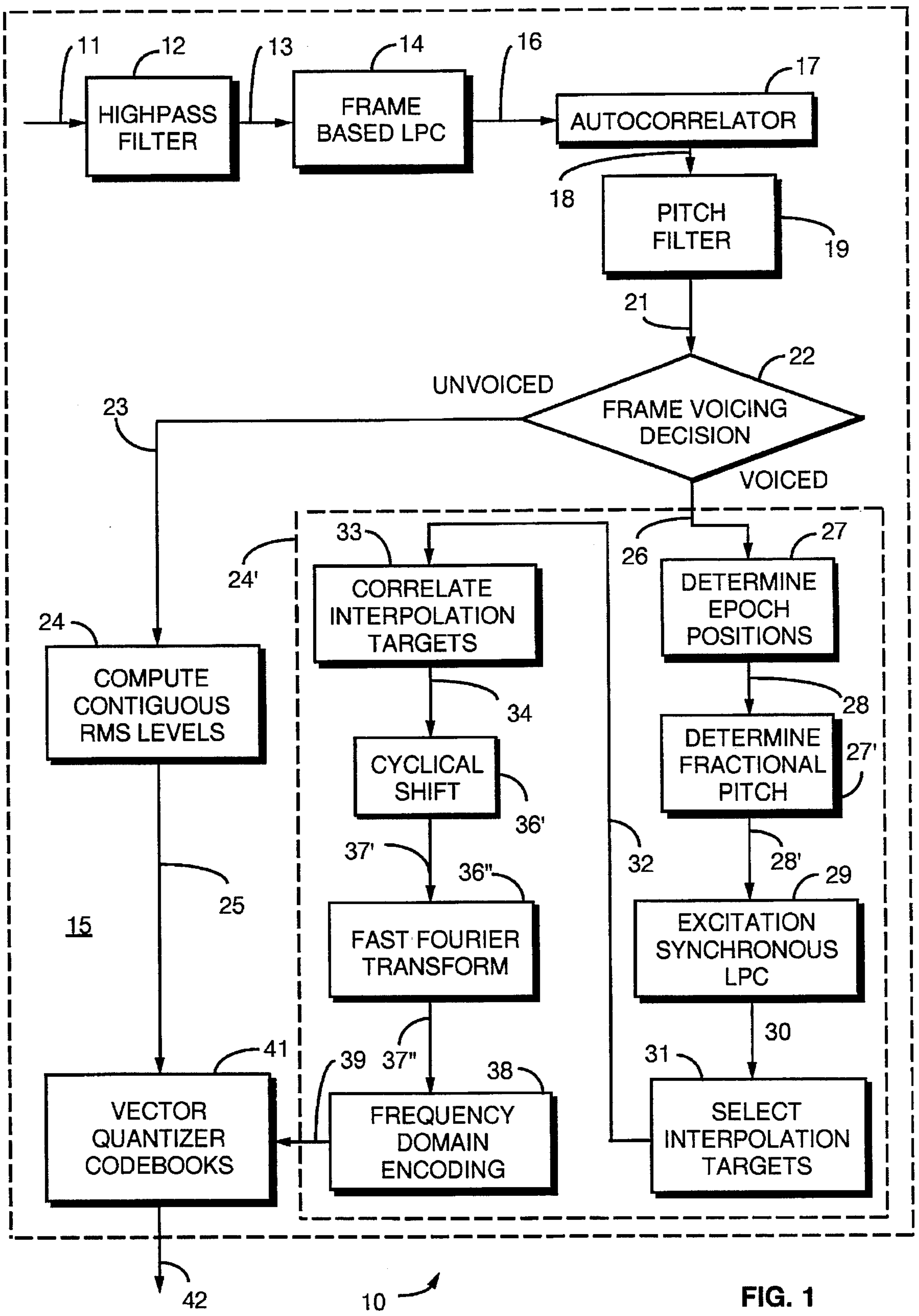
FIG. 1 is a simplified block diagram, in flow chart form, of a speech digitizer in a transmitter in accordance with the present invention.

The exemplification set out herein illustrates a preferred embodiment of the invention in one form thereof, and such exemplification is not intended to be construed as limiting in any manner.

DETAILED DESCRIPTION OF THE DRAWING

As used herein, the terms "excitation", "excitation function", "driving function" and "excitation waveform" have equivalent meanings and refer to a waveform provided by linear predictive coding apparatus as one of the output signals therefrom. As used herein, the terms "target", "excitation target" and "target epoch" have equivalent meanings and refer to an epoch selected first for characterization in an encoding apparatus and second for later interpolation in a decoding apparatus. FIG. 1 is a simplified block diagram, in flow chart form, of speech digitizer 15 in transmitter 10 in accordance with the present invention.

A primary component of voiced speech (e. g., "oo" in "shoot") is conveniently represented as a quasi-periodic, impulse-like driving function or excitation function having slowly varying envelope and period. This period is referred to as the "pitch period" or epoch, comprising an individual impulse within the driving function. Conversely, the driving function associated with unvoiced speech (e.g., "ss" in "hiss") is largely random in nature and resembles shaped noise, i.e., noise having a time-varying envelope, where the envelope shape is a primary information-carrying component.

The composite voiced/unvoiced driving waveform may be thought of as an input to a system transfer function whose output provides a resultant speech waveform. The composite driving waveform may be referred to as the "excitation function" for the human voice. Thorough, efficient characterization of the excitation function yields a better approximation to the unique attributes of an individual speaker, which attributes are poorly represented or ignored altogether in reduced bandwidth voice coding schemata to date (e.g., LPC10e).

In the arrangement according to the present invention, speech signals are supplied via input 11 to highpass filter 12. Highpass filter 12 is coupled to frame based linear predictive coding (LPC) apparatus 14 via link 13. LPC apparatus 14 provides 5 an excitation function via link 16 to autocorrelator 17.

Autocorrelator 17 estimates $\tau$, the integer pitch period in samples (or regions) of the quasi-periodic excitation waveform. The excitation function and the $\tau$ estimate are input via link 18 pitch loop filter 19, which estimates excitation function structure associated with the input speech signal. Pitch loop filter 19 is well known in the art (see, for example, "Pitch Prediction Filters In Speech Coding", by R. P. Ramachandran and P. Kabal, in IEEE Transactions on Acoustics, Speech and Signal Processing, vol. 37, no. 4, April 1989). The estimates for LPC prediction gain (from frame based LPC apparatus 14), pitch loop filter prediction gain (from pitch loop filter 19) and filter coefficient values (from pitch loop filter 19) are used in decision block 22 to determine whether input speech data represent voiced or unvoiced input speech data.

Unvoiced excitation data are coupled via link 23 to block 24, where contiguous RMS levels are computed. Signals representing these RMS levels are then coupled via link 25 to vector quantizer codebooks 41 having general composition and function are well known in the art.

Typically, a 30 millisecond frame of unvoiced excitation comprising 240 samples is divided into 20 contiguous time slots. The excitation signal occurring during each time slot is analyzed and characterized by a representative level, conveniently realized as an RMS (root-mean-square) level. This effective technique for the transmission of unvoiced frame composition offers a level of computational simplicity not possible with much more elaborate frequency-domain fast Fourier transform (FFT) methods, without significant compromise in quality of the reconstructed unvoiced speech signals.

Voiced excitation data are frequency-domain processed in block 24', where speech characteristics are analyzed on a "per epoch" basis. These data are coupled via link 26 to block 27, wherein epoch positions are determined. Following epoch position determination, data are coupled via link 28 to block 27', where fractional pitch is determined Data are then coupled via link 28' to block 29, wherein excitation synchronous LPC analysis is performed on the input speech given the epoch positioning data (from block 27), both provided via link 28'.

This process provides revised LPC coefficients and excitation function which are coupled via link 30 to block 31, wherein a single excitation epoch is chosen in each frame as an interpolation target. The single epoch may be chosen randomly or via a closed loop process as is known in the art. Excitation synchronous LPC coefficients (from LPC apparatus 29), corresponding to the target excitation function are chosen as coefficient interpolation targets and are coupled via link 30 to select interpolation targets 31. Selected interpolation targets (block 31) are coupled via link 32 to correlate interpolation targets 33.

The LPC coefficients are utilized via interpolation to regenerate data elided in the transmitter at the receiver (discussed in connection with FIG. 4, infra). As only one set of LPC coefficients and information corresponding to one excitation epoch are encoded at the transmitter, the remaining excitation waveform and epoch-synchronous coefficients must be derived from the chosen "targets" at the receiver. Linear interpolation between transmitted targets has been used with success to regenerate the missing information, although other non-linear schemata are also useful. Thus, only a single excitation epoch (i.e., voiced speech) is frequency domain analyzed and encoded per frame at the transmitter, with the intervening epochs filled in by interpolation at receiver 9.

Figure 2:
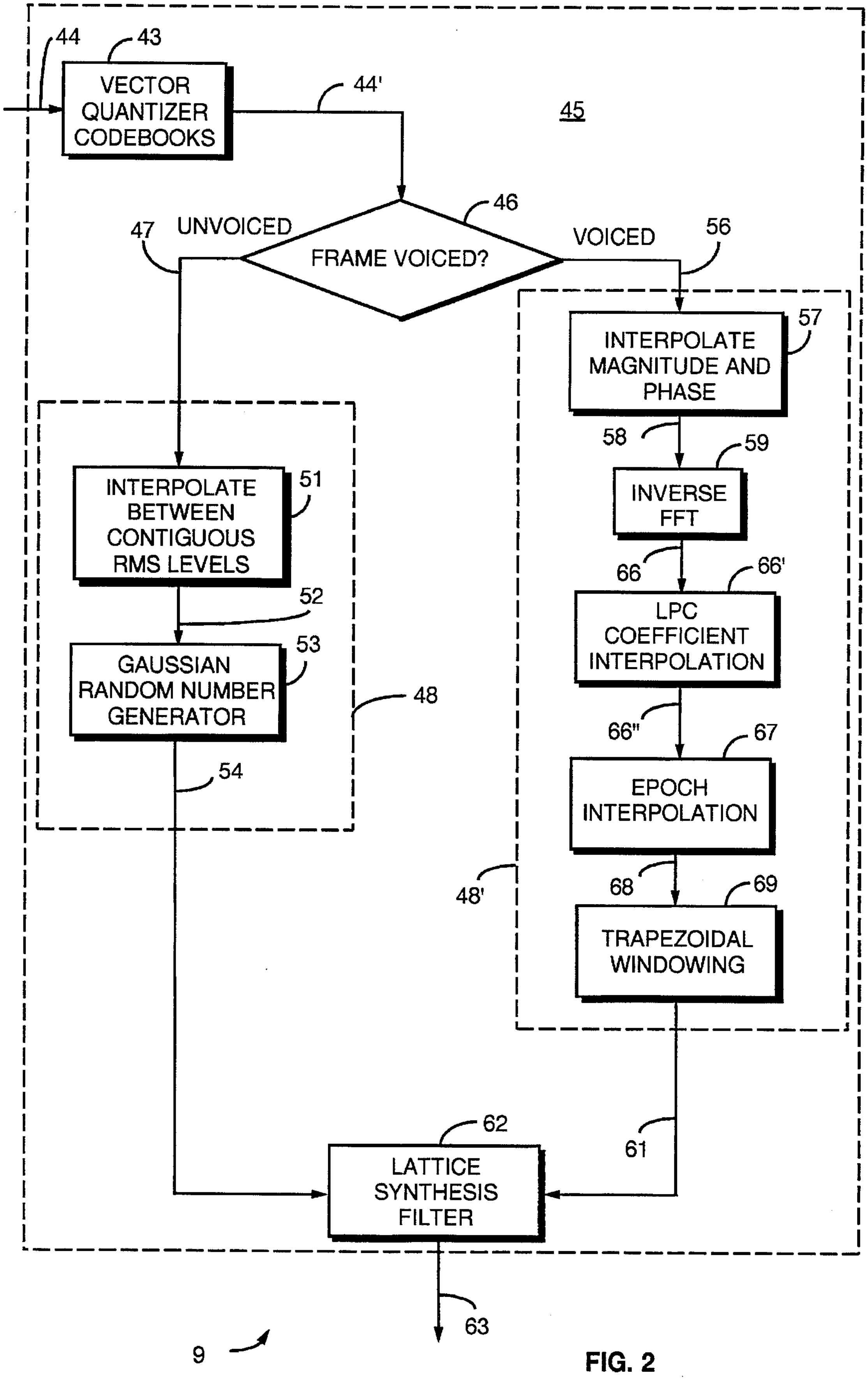
FIG. 2 is a simplified block diagram, in flow chart form, of a speech synthesizer in a receiver for digital data provided by an apparatus such as the transmitter of FIG. 1.

Chosen epochs are coupled via link 32 to block 33, wherein chosen epochs in adjacent frames (e.g., the chosen epoch in the preceding frame) are cross-correlated in order to determine an optimum epoch starting index and enhance the effectiveness of the interpolation process. By correlating the two targets, the maximum correlation index shift may be introduced as a positioning offset prior to interpolation. This offset improves on the standard interpolation scheme by forcing the "phase" of the two targets to coincide. Failure to perform this correlation procedure prior to interpolation often leads to significant reconstructed excitation envelope error at receiver 9 (FIG. 2, infra).

The correlated target epochs are coupled via link 34 to cyclical shift 36' wherein data are shifted or "rotated" in the data array. Shifted data are coupled via link 37' and then fast Fourier transformed (FFT) (block 36"). Transformed data are coupled via link 37" and are then frequency domain encoded (block 38). In receiver 9 (discussed in connection with FIG. 2, infra), interpolation is used to regenerate information elided in transmitter 10. As only one set of LPC coefficients and one excitation epoch are encoded at the transmitter, the remaining excitation waveform and epoch-synchronous coefficients must be derived from the chosen "targets" at the receiver. Linear interpolation between transmitted targets has been used with success to regenerate the missing information, although other non-linear schemata are also useful.

Only one excitation epoch is frequency domain characterized (and the result encoded) per frame of data, and only a small number of characterizing samples are required to adequately represent the salient features of the excitation epoch, e.g., four magnitude levels and sixteen phase levels may be usefully employed. These levels are usefully allowed to vary continuously, e.g., sixteen real-valued phases, four real-valued magnitudes.

The frequency domain encoding process (blocks 36', 36", 38) usefully comprises fast-Fourier transforming (FFT) M many samples of data representing a single epoch, typically thirty to eighty samples which are desirably cyclically shifted (block 36') in order to reduce phase slope. These M samples are desirably indexed such that the sample indicating the epoch peak, designated the $N^{th}$ sample, is placed in the first position of the FFT input matrix, the samples preceding the $N^{th}$ sample are placed in the last N-1 positions (i.e., positions $2^n$-N to $2^n$, where $2^n$ is the frame size) of the FFT input matrix and the N+$1^{st}$ through $M^{th}$ samples follow the $N^{th}$ sample. The sum of these two cyclical shifts effectively reduces frequency domain phase slope, improving coding precision and also improves the interpolation process within receiver 9 (FIG. 2). The data are "zero filled" by placing zero in the $2^n$-M elements of the FFT input matrix not occupied by input data and the result is fast Fourier transformed, where $\mathbf{2^n}$ represents the size of the FFT input matrix.

Amplitude and phase data in the frequency domain are desirably characterized with relatively few samples. For example, the frequency spectrum may be divided into four one kilohertz bands and representative signal levels may be determined for each of these four bands. Phase data are usefully characterized by sixteen values and the quality of the reconstructed speech is enhanced when greater emphasis is placed in characterizing phase having lower frequencies, for example, over the bottom 500 Hertz of the spectrum. An example of positions selected to represent the 256 data points from FFT 36", found to provide high fidelity reproduction of speech, is provided in Table I below. It will be appreciated by those of skill in the art to which the present invention pertains that the values listed in Table I are examples and that other values may alternatively be employed.

0, 1, 2, 3, 4, 8, 12, 16, 20, 24, 28, 32, 48, 64, 96, 128 Table I. Listing of selected samples of 256 samples of phase data (from FFT, block 36") selected (block 38).

The listing shown in Table I emphasizes initial (low frequency) data (elements 0–4) most heavily, intermediate data (elements 5–32) less heavily, and is progressively sparser as frequency increases further. With this set of choices, the speaker-dependent characteristics of the excitation are largely maintained and hence the reconstructed speech more accurately represents the tenor, character and data-conveying nuances of the original input speech.

While four amplitude spectral bands and sixteen phase levels are mentioned herein as examples of numbers of discrete levels providing useful results, it will be appreciated that other numbers of characterization data may be employed with attendant increases or decreases in the volume of data required to describe the results and attendant alteration of fidelity in reconstruction of speech signals.

Since only one excitation epoch, compressed to a few characterizing samples, is utilized in each frame, the data rate (bandwidth) required to transmit the resultant digitally-encoded speech is reduced. High quality speech is produced at the receiver even though transmission bandwidth requirements are reduced. As with the characterization process (block 24) employed for data representing unvoiced speech, the voiced frequency-domain encoding procedure provides significant fidelity advantages over simpler or less sophisticated techniques which fail to model the excitation characteristics as carefully as is done in the present invention.

The resultant characterization data (i.e., from block 38) are passed to vector quantizer codebooks 41 via link 39. Vector quantized data representing unvoiced (link 25) and voiced (link 39) speech are coded using vector quantizer codebooks 41 and coded digital output signals are coupled to transmission media, encryption apparatus or the like via link 42.

FIG. 2 is a simplified block diagram, in flow chart form, of speech synthesizer 45 in receiver 9 for digital data provided by an apparatus such as transmitter 10 of FIG. 1. Receiver 9 has digital input 44 coupling digital data representing speech signals to vector quantizer codebooks 43 from external apparatus (not shown) providing decryption of encrypted received data, demodulation of received RF or optical data, interface to public switched telephone systems and/or the like. Quantized data from vector quantizer codebooks 43 are coupled via link 44' to decision block 46, which determines whether vector quantized input data represent a voiced frame or an unvoiced frame.

When vector quantized data (link 44') represent an unvoiced frame, these data are coupled via link 47 to time domain signal processing block 48. Time domain signal processing block 48 desirably includes block 51 coupled to link 47. Block 51 linearly interpolates between the contiguous RMS levels to regenerate the unvoiced excitation envelope. The result is employed to amplitude modulate noise generator 53, which is desirably realized as a Gaussian random number generator, via link 52 to recreate the unvoiced excitation signal. This unvoiced excitation function is coupled via link 54 to lattice synthesis filter 62. Lattice synthesis filters such as 62 are common in the art and are described, for example, in Digital Processing of Speech Signals, by L. R. Rabiner and R. W. Schafer (Prentice Hall, Englewood Cliffs, N.J., 1978).

When vector quantized data (link 44') represent voiced input speech, these data are coupled to magnitude and phase interpolator 57 via link 56, which interpolates the missing frequency domain magnitude and phase data (which were not transmitted in order to reduce transmission bandwidth requirements). These data are inverse fast Fourier transformed (block 59) and the resultant data are coupled via link 66 for subsequent LPC coefficient interpolation (block 66'). LPC coefficient interpolation (block 66') is coupled via link 66" to epoch interpolation 67, wherein data are interpolated between the target excitation (from iFFT 59) and a similar excitation target previously derived (e.g., in the previous frame), re-creating an excitation function (associated with link 68) approximating the excitation waveform employed during the encoding process (i.e., in speech digitizer 15 of transmitter 10, FIG. 1).

Artifacts of the inverse FFT process present in data coupled via link 68 are reduced by windowing (block 69), suppressing edge effects or "spikes" occurring at the beginning and end of the FFT output matrix (block 59), i.e., discontinuities at FFT frame boundaries. Windowing (block 69) is usefully accomplished with a trapezoidal window function but may also be accomplished with other window functions as is well known in the art. Due to relatively slow variations of excitation envelope and pitch within a frame, these interpolated, concatenated excitation epochs mimic characteristics of the original excitation and so provide high fidelity reproduction of the original input speech. The windowed result representing reconstructed voiced speech is coupled via link 61 to lattice synthesis filter 62.

For both voiced and unvoiced frames, lattice synthesis filter 62 synthesizes high-quality output speech coupled to external apparatus (e.g., speaker, earphone, etc., not shown in FIG. 2) closely resembling the input speech signal and maintaining the unique speaker-dependent attributes of the original input speech signal whilst simultaneously requiring reduced bandwidth (e.g., 2400 bits per second or baud).

EXAMPLE

Figure 3:
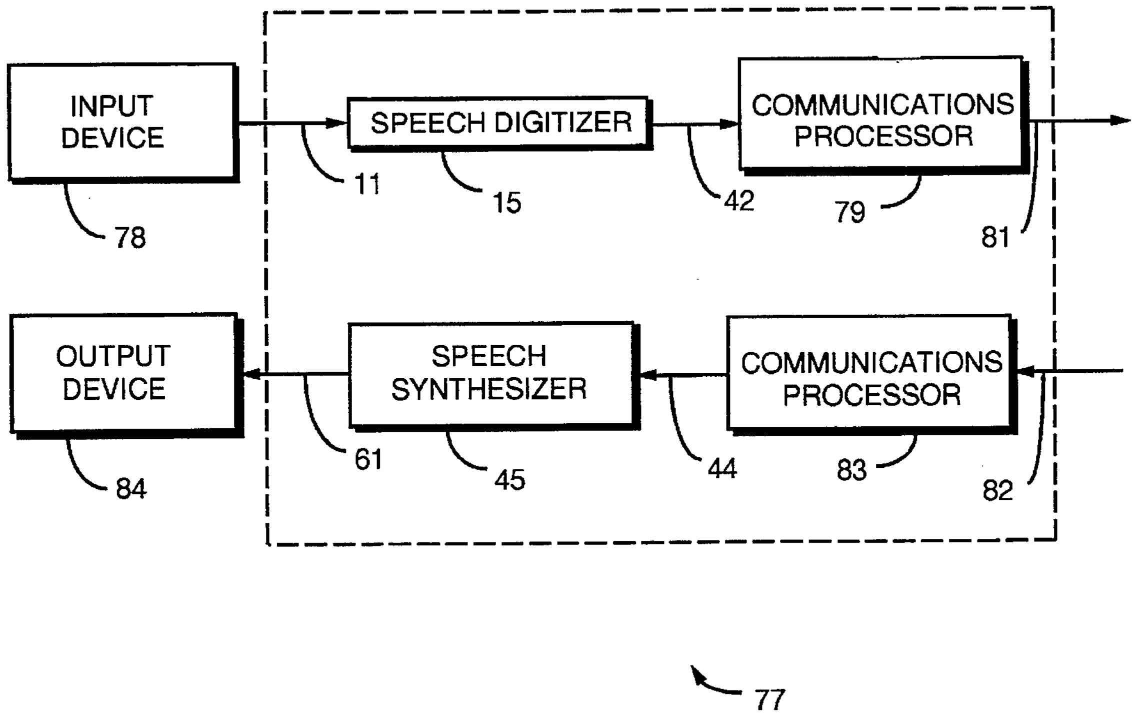
FIG. 3 is a highly simplified block diagram of a voice communication apparatus employing the speech digitizer of FIG. 1 and the speech synthesizer of FIG. 2 in accordance with the present invention.

FIG. 3 is a highly simplified block diagram of voice communication apparatus 77 employing speech digitizer 15 (FIG. 1)and speech synthesizer 45 (FIG. 2) in accordance with the present invention. Speech digitizer 15 and speech synthesizer 45 may be implemented as assembly language programs in digital signal processors such as Type DSP56001, Type DSP56002 or Type DSP96002 integrated circuits available from Motorola, Inc. of Phoenix, Ariz. Memory circuits, etc., ancillary to the digital signal processing integrated circuits, may also be required, as is well known in the art.

Voice communications apparatus 77 includes speech input device 78 coupled to speech input 11. Speech input device 78 may be a microphone or a handset microphone, for example, or may be coupled to telephone or radio apparatus or a memory device (not shown) or any other source of speech data. Input speech from speech input 11 is digitized by speech digitizer 15 as described in FIG. 1 and associated text. Digitized speech is output from speech digitizer 15 via output 42.

Voice communication apparatus 77 may include communications processor 79 coupled to output 42 for performing additional functions such as dialing, speakerphone multiplexing, modulation, coupling signals to telephony or radio networks, facsimile transmission, encryption of digital signals (e.g., digitized speech from output 42), data compression, billing functions and/or the like, as is well known in the art, to provide an output signal via link 81.

Similarly, communications processor 83 receives incoming signals via link 82 and provides appropriate coupling, speakerphone multiplexing, demodulation, decryption, facsimile reception, data decompression, billing functions and/or the like, as is well known in the art.

Digital signals representing speech are coupled from communications processor 83 to speech synthesizer 45 via link 44. Speech synthesizer 45 provides electrical signals corresponding to speech signals to output device 84 via link 61. Output device 84 may be a speaker, handset receiver element or any other device capable of accommodating such signals.

It will be appreciated that communications processors 79, 83 need not be physically distinct processors but rather that the functions fulfilled by communications processors 79, 83 may be executed by the same apparatus providing speech digitizer 15 and/or speech synthesizer 45, for example.

It will be appreciated that, in an embodiment of the present invention, links 81, 82 may be a common bidirectional data link. It will be appreciated that in an embodiment of the present invention, communications processors 79, 83 may be a common processor and/or may comprise a link to apparatus for storing or subsequent processing of digital data representing speech or speech and other signals, e.g., television, camcorder, etc.

Voice communication apparatus 77 thus provides a new apparatus and method for digital encoding, transmission and decoding of speech signals allowing high fidelity reproduction of voice signals together with reduced bandwidth requirements for a given fidelity level. The unique frequency domain excitation characterization (for voiced speech input) and reconstruction techniques employed in this invention allow significant bandwidth savings and provide digital speech quality previously only achievable in digital systems having much higher data rates.

For example, selecting an epoch, fast Fourier transforming the selected epoch and thinning data representing the selected epoch to reduce the amount of information necessary provide substantial benefits and advantages in the encoding process, while the interpolation from frame to frame in the receiver allows high fidelity reconstruction of the input speech signal from the encoded signal. Further, characterizing unvoiced speech by dividing a set of speech samples into a series of contiguous windows and measuring an RMS signal level for each of the contiguous windows comprises substantial reduction in complexity of signal processing.

Thus, an pitch epoch synchronous linear predictive coding vocoder and method have been described which overcome specific problems and accomplish certain advantages relative to prior art methods and mechanisms. The improvements over known technology are significant. The expense, complexities, and high power consumption of previous approaches are avoided. Similarly, improved fidelity is provided without sacrifice of achievable data rate.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications; equivalents and variations as fall within the spirit and broad scope of the appended claims.

I claim:

1. A method for pitch epoch synchronous encoding of speech signals, said method comprising steps of:

inputting an input speech signal;

processing the input speech signal to characterize qualities including linear predictive coding coefficients;

determining when the input speech signal comprises voiced speech;

analyzing input speech signals using frequency domain techniques when input speech signals comprise voiced speech to provide an excitation function;

determining when the input speech signal comprises unvoiced speech;

characterizing the input speech signals using time domain techniques when the input speech signals comprise unvoiced speech to provide an excitation function; and encoding the excitation function to provide a digital output signal representing the input speech signal, wherein characterizing input speech signals using frequency domain techniques comprises steps of:

determining epoch excitation positions within a frame of speech data;

determining fractional pitch;

determining a group of synchronous linear predictive coding (LPC) coefficients by performing epoch-synchronous LPC analysis; and selecting an interpolation excitation target from within a particular epoch of speech data to provide a target excitation function, wherein the target excitation function comprises per-epoch speech parameters and wherein said encoding step includes encoding fractional pitch and synchronous LPC coefficients.

2. A method as claimed in claim 1, wherein characterizing input speech signals using time domain techniques comprises steps of:

dividing a frame of unvoiced speech into a series of contiguous regions;

determining a root-mean-square (RMS) amplitude for each of the series of contiguous regions; and encoding the RMS amplitudes using a vector quantizer codebook to provide digital signals representing unvoiced speech.

3. A method as claimed in claim 1, further comprising steps of:

correlating a present selected interpolation excitation target with a prior selected interpolation excitation target;

adjusting indices of the correlated interpolation excitation target; and fast Fourier transforming the index-adjusted correlated interpolation excitation target.

4. An apparatus for pitch epoch synchronous encoding of speech signals comprising:

an input for receiving input speech signals;

means for determining voicing of said input speech signals, said means for determining voicing coupled to said input;

first means for analyzing said input speech signals using frequency domain techniques coupled to said means for determining voicing, said first analyzing means operating when said input speech signals comprise voiced speech and providing analyzed speech as output signals;

second means for analyzing said input speech signals using time domain techniques coupled to said means for determining voicing, said second analyzing means operating when said input speech signals comprise unvoiced speech and providing analyzed speech as output signals; and means for encoding said analyzed speech to provide a digital output signal representing said input speech signal coupled to said first and second analyzing means, wherein said first means for analyzing said input speech comprises:

means for determining epoch excitation positions within a frame of speech data coupled to said means for determining voicing;

interpolation target selection means coupled to said determining means, said interpolation target selection means for selecting an excitation target from within a particular epoch of speech data to provide a target excitation function, wherein said target excitation function comprises per-epoch speech parameters;

means for correlating a present selected interpolation excitation target with a prior selected interpolation excitation target, said correlating means coupled to said interpolation target selection means;

means for adjusting indices of the correlated interpolation excitation target coupled to said correlating means; and fast Fourier transform means for transforming the index-adjusted correlated interpolation excitation target coupled to said adjusting means, said fast Fourier transform means providing transformed data.

5. An apparatus as claimed in claim 4, wherein said second analyzing means includes:

means for computing representative signal levels in a series of contiguous time slots comprising a frame length, said means for computing representative signal levels coupled to said means for determining voicing; and vector quantizer codebooks coupled to said means for computing representative signal levels, said vector quantizer codebooks for providing vector quantized digital signals corresponding to said input speech signals.

6. An apparatus as claimed in claim 4, wherein said means for computing representative signal levels comprises means for computing root-mean-square signal levels in a series of contiguous time slots.

7. An apparatus as claimed in claim 4, further comprising means for analyzing amplitude and phase of said transformed data, said analyzing means providing a sparse data set from said transformed data, said analyzing means coupled to said encoding means.

8. A method for pitch epoch synchronous encoding of speech signals, said method comprising steps of:

inputting an input speech signal;

processing the input speech signal to characterize qualities including linear predictive coding coefficients;

determining when the input speech signal comprises voiced speech;

analyzing input speech signals using frequency domain techniques when input speech signals comprise voiced speech to provide an excitation function, wherein said step of analyzing input speech signals using frequency domain techniques comprises steps of:

determining epoch excitation positions within a frame of speech data;

determining fractional pitch;

determining a group of synchronous linear predictive coding (LPC) coefficients by performing epoch-synchronous LPC analysis; and selecting an interpolation excitation target from within a particular epoch of speech data to provide a target excitation function, wherein the target excitation function comprises per-epoch speech parameters and wherein said encoding step includes encoding fractional pitch and synchronous LPC coefficients; and encoding the excitation function to provide a digital output signal representing the input speech signal.

9. A method as claimed in claim 8, further comprising steps of:

determining when the input speech signal comprises unvoiced speech; analyzing the input speech signals using time domain techniques when the input speech signals comprise unvoiced speech to provide an excitation function, wherein said step of analyzing input speech signals using time domain techniques comprises steps of:

dividing a frame of unvoiced speech into a series of contiguous regions;

determining a root-mean-square (RMS) amplitude for each of the series of contiguous regions; and encoding the RMS amplitudes using a vector quantizer codebook to provide digital signals representing unvoiced speech; and encoding the excitation function to provide a digital output signal representing the input speech signal.

* * * * *